Sept. 4, 1962     F. C. ROSCH, JR     3,052,446
VALVE APPARATUS
Filed May 12, 1960
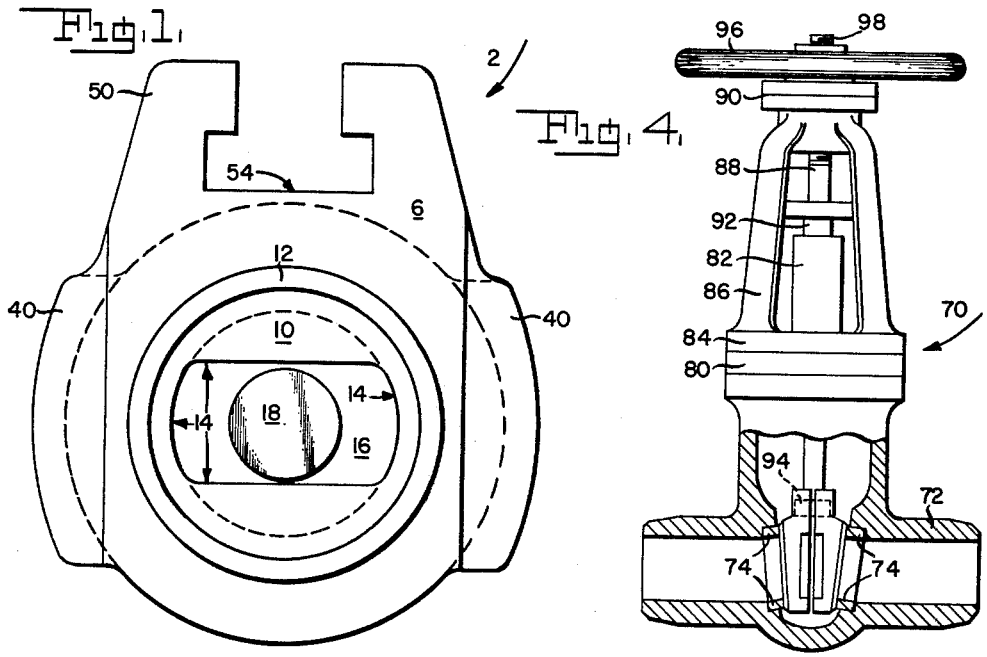
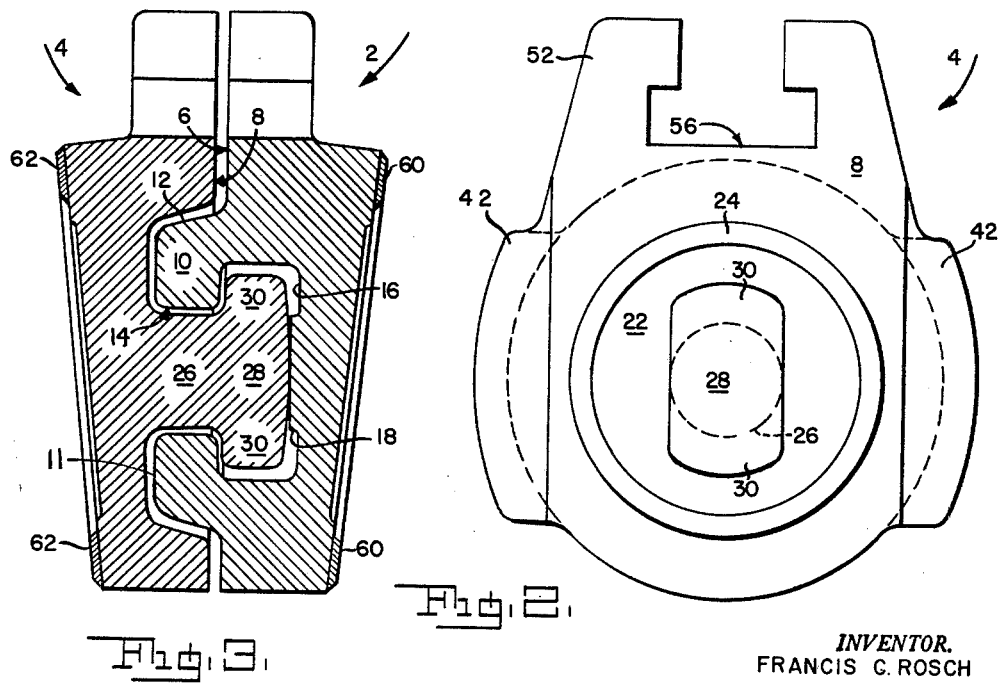
INVENTOR.
FRANCIS C. ROSCH
BY
*Kenwood Ross*
ATTORNEY

United States Patent Office 3,052,446
Patented Sept. 4, 1962

3,052,446
VALVE APPARATUS
Francis C. Rosch, Jr., East Longmeadow, Mass., assignor to The Chapman Valve Mfg. Co., Indian Orchard, Mass., a corporation
Filed May 12, 1960, Ser. No. 28,569
1 Claim. (Cl. 251—327)

This invention relates to new and useful improvements in a valve construction and is directed more particularly to improvements in a valve embodying a two-part wedge or gate which is movable to close and open said valve.

The principal object of the invention is directed to the provision of a wedge means which includes interlocking parts having seat rings or seating surfaces for engaging the seats or seating surfaces of a valve body in the closed position thereof.

Valve constructions have been known wherein a wedge, having relatively converging seats or seating surfaces, is arranged so that, in the closed seated position thereof, the said seats engage the seats of the valve body. In such constructions, it has been sometimes impossible to provide the desired tight seating of the wedge due to the lack of the necessary precision machining during manufacture. In operational use, foreign matter settling between the seats at either side of the wedge has often prevented the proper seating of the wedge on the valve body.

An important feature of the present invention is the provision of a wedge for a valve which is adapted to overcome the above itemized and other disadvantages and objections common to prior art valves of this general type.

According to novel features hereof, a wedge means is provided which includes a pair of separate tapered half-parts which are releasably interlocked in wedge-forming relation in such manner that the half-parts are relatively movable and rotatable as to each other. In this way, each half-part may have its respective seating surface in proper seating contact with its cooperating body seat so as to provide the desired tight seating of the wedge in its closed position.

The wedge half-parts being relatively movable, the seating of one half-part on its respective cooperating body seat is not influenced by the positioning of the other half-part. That is, each half-part may adjust itself to its respective cooperating body seat, and foreign matter between one half-part and its respective body seat will not necessarily interfere with the proper seating of the other half-part. Should any misalignment occur, due to improper machining, said half-parts may be easily and relatively moved so as to adjust to the conditions and accommodate for any "out-of-flatness," all so as to provide the desired tightly seated relation.

The half-parts, which may be called female and male parts, are easily and readily assembled and may be interlocked in wedge forming relation, when given a 90° twist in a plane parallel to their inner confronting surfaces and coact properly so as to operate efficiently with their respective body seats in the valve closing position of the wedge.

In another general way, the invention hereof may be defined as relating to a multi-part or split wedge adapted to be used in standard bodies and in which the parts are supported as to each other by means provided on their confronting surfaces whereby one of the parts is rotationally movable relative to the other and further by means of a connection of each of the parts to a common spindle to insure against more than reasonable rotation once the parts are assembled in operative position. That is, the securement of the parts against rotation around and relative to the body casing and more particularly around and relative to the fluid passage through said body casing is the desideratum for the reason that with the rotation of the plates, or one of them, the plate or plates would not offer the wedge angle essential for tight contacting with the seat surfaces of the valve body.

It has been known to provide a slide valve wherein plates are supported against each other on a spherical surface and are guided by means of ribs projecting outwardly from the inner wall of the casing, which ribs are engaged by lugs positioned on the plates, or are guided by means of guide rods which are engaged by lugs positioned on the plates. However, it is also known that with such slide valve, plate jamming frequently occurs, especially where the valve is incorporated into a horizontally disposed pipe and a horizontally disposed spindle, in which instance, the plates are horizontally disposed so as to offer resistance to proper movement due to their very weight, thus leading to frequent jamming of the plates.

It has also been known to mount such plates in a plate holder on which the plates are supported on a ball disposed therebetween. The plates are secured against rotation by the incorporating therewith of guide means in the plate holder. Such construction has been found objectionable however for the reason that additional component parts are necessitated so as to make such valve unreasonably costly.

Various changes and modifications may be made within the spirit and scope of the invention hereinafter set forth in a presently preferred form and shown in the drawing wherein:

FIGS. 1 and 2 are elevational views of the inner adjacent sides or faces of the female and male half-parts respectively forming the wedge of the invention;

FIG. 3 is a vertical sectional view through the male and female half-parts in their assembled relation; and FIG. 4 is a small-scale side-elevational view of a valve embodying the novel features of the invention.

A tapered female half-part is generally indicated by 2 in FIG. 1 and a tapered male half-part is generally indicated by 4 in FIG. 2.

Female half-part 2 has an inner face or side 6 and male half-part 4 has an inner face or side 8, said inner faces 6 and 8 being held in adjacency in the assembled interlocked relation thereof, as shown in FIGS. 3 and 4.

The inner face of female half-part 2 is provided with an outwardly projecting annular ring 10 integral therewith and centrally positioned relative to said inner face. The annular ring projects outwardly of the vertical plane of the inner face or side 6 to offer an outer wall 11 which is disposed in a plane parallel with the plane of said inner face 6, and is provided with an annular outermost side wall 12 which diverges outwardly to merge into said inner face or side 6.

Centrally of the annular ring 10, a generally rectangular opening or throat 14 extends therethrough and communicates with a circular well 16 concentric relative to and within said ring and recessed into and centrally of the female half-part 2.

The recess 16 extends sufficiently into said female half-part 2 that its inner or rearward vertical wall 16 is disposed in a plane parallel with the plane of said inner face 6, and is of a diameter at least equal to the dimension of the opening 14 in one direction, which diameter is greater than the dimension of the opening 14 in a direction transverse thereto.

The rearward vertical wall 16 is provided with an outwardly extending circular raised pad or button 18 which is in alignment with the longitudinal axis of the opening or throat 14.

The inner face 8 of male half-part 4 is provided with a central circular depression or recess having an annular inner or rearward vertical wall 22 connected to said inner face at its peripheral edge by a tapered wall 24. Centrally of this circular depression or recess, a stud integral with the male half-part 4 projects outwardly from the inner or rearward wall 22 and includes a central circular post 26 and an elongated head or bar 28 on its outer end, said head preferentially having a slightly crowned outermost face and having a width at least equal to the diameter of the circular post 26 and a length greater than the said diameter so as to provide a stud of generally T-shape.

The head 28 is of such width and length as to be receivable in and through the opening or throat 14 of the female half-part 2, when the half-parts are disposed at right angles to each other, the dimensions of the head 28 being less than the corresponding dimensions of the throat or opening. The height of the stud, from the plane of the inner wall 22 to the outermost plane of the head 30, is of a dimension slightly greater than the distance from the outer plane of the annular ring 10 through the opening 14 and the well to the outer plane of the button 18.

In this manner, upon assembly of the wedge half-parts, with the inner faces thereof in adjacency, same are so positioned or turned relative to one another that the post 26 and head 28 of the male half-part may be passed into and through the throat 14 of the female half-part. Thus interengaged, one of said half-parts may be rotated 90° relative to the other thereof and in a plane parallel to the plane of the confronting inner surfaces 6 and 8. In this manner the opposite ends 30 of the head 28 are disposed in the recess 16 inwardly of the annular ring 10. Thus, the wedge half-parts are in the interlocked or assembled relation, as shown in FIG. 3. As will be seen, while the outer surface of the head 28 engages the flat raised pad or surface 18, the half-parts are nonetheless arranged for the relative movements desired.

The female and male half parts are provided, on opposite longitudinal sides thereof, with elongated guide members 40 and 42 respectively for sliding engagement relative to guideways, of usual form commonly provided in a valve body, for movement of the formed wedge between closed and upper open positions.

Upper portions 50 and 52 of the female and male half-parts respectively are provided with inverted T slots 54 and 56 respectively which are registrable, in the assembled relation of said half-parts, to receive a lower portion of a valve spindle.

The opposite outer faces of the half-parts 2 and 4 are provided with seating surfaces or seats 60 and 62 respectively, which may be secured thereto in any suitable manner, or may be formed thereon, in accordance with any of the well known practices.

With the half-parts assembled, as heretofore explained, so that they are rotated as to each other, the T slots 54 and 56 may be brought into register with each other.

The wedge half-parts 2 and 4 are shown, in FIG. 4, in assembled relation in the body 72 of a valve 70, with the respective guide means 40 and 42 being in sliding engagement with the body guideways. The seating means 60 and 62 of the wedge half-parts are shown in engagement with the respective seats 74 of the valve body.

A bonnet support plate 80, over the lower portion of a bonnet 82, and the lower portion 84 of a yoke 86 are secured to the upper portion of the valve body in any well known manner.

An elongated spindle or stem 88 extends through an upper portion 90 of the yoke 86 and a stuffing box 92 of the bonnet 82 and has a lower portion 94 operably engaged in the aligned T slots 54 and 56 of the wedge half-parts.

A hand wheel 96 is in threaded engagement with the upper threaded end 98 of the spindle, and as said hand wheel is rotated in one direction or the other, the spindle is moved up or down to move the wedge between the closed position shown and an open position upwardly thereof.

The lower portion of the spindle fits sufficiently loosely in the T slots 54 and 56 of the wedge half-parts as to permit of the desired relative movements of said wedge half-parts thereby to facilitate the proper seating of the half-parts on their respective body seats.

It will be noted that the wedge half-parts are rather loosely interconnected in their assembled relation whereby they are adapted for relative movement when engaging their respective body seats.

The slightly crowned face of the head 28 of the male half-part permits relative tilting movements of said half-parts so that the seat means of each half-part may seat throughout its area on its body seat.

While permitting relative tilting of the half-parts, and with the crowned surface of the head and pad being in contact, the downward force of the spindle on the wedge half-parts enables same to be pressed against the body seats.

It will be noted that, in all cases, the ledges are spaced outwardly from the inner face of the female half-part so that the ends 30 of the head of the male part may be loosely disposed inwardly thereof, said head being spaced outwardly from the inner face of the male part. That is, there are spaces inwardly of the ledges to receive opposite ends of the head for rather loose interlocking of the wedge half-parts.

In summation, the invention hereof relates to improvements in a valve having a two-part wedge or gate movable to close and open the valve.

The wedge includes interlocking parts having seat rings or seating surfaces for engaging the seats or seating surfaces of a valve body in the closed position.

The structure overcomes the feature wherein a wedge, having relatively converging seats or seating surfaces, is arranged so that in closed seated position thereof the seats thereof engage the seats of a body wherein it has been difficult, if not impossible, to provide the proper and tight seating of the wedge in the body.

Here, a wedge is provided which includes a pair of separate half-parts which are releasably interlocked in wedge forming relation so that the half-parts are relatively movable. In this way, each half-part may have its seating surface in proper seating contact with its cooperating body seat to provide the desired tight seating of the wedge in closed position.

The wedge parts hereof are relatively movable so that the seating of one half-part of the wedge on its cooperating body seat is not influenced by the other half-part. Should any misalignment result, due to faulty machining, the half-parts may relatively move to accommodate the conditions and provide the desired tightly seated relation.

The half-parts may be easily and readily assembled or interlocked in wedge forming relation, and operate efficiently with their respective body seats in the valve closing position of the wedge.

Various changes and modifications may be made in the practice of the invention within the spirit and scope thereof, and it is desired to be limited, if at all, by the appended claim, rather than by the foregoing description.

We claim:

In a valve structure including a body having relatively spaced wedge-receiving seats and a reciprocable spindle, the improvement comprising a wedge for engaging between the wedge-receiving seats and including, a tapered male half-part, a tapered female half-part, said male and female half-parts having oppositely-facing seat-engaging outer faces and inner faces disposable in adjacency and adapted for confrontation in assembled relation, said female half-part having an integral annular ring with an outer ring wall projecting beyond and parallel to the plane of the inner face thereof and defining a circular well within said annular ring, said outer ring wall having a generally-rectangular throat extending transversely of the longitudinal vertical axis of said female half-part and through said outer ring wall and communicating with the circular well, the inner wall of the circular well being disposed in a plane inwardly of and parallel to the plane of the inner face of said female half-part and having a raised button surface centrally and extending outwardly therefrom, said male half-part having a central circular recess extending inwardly from the inner face thereof and a T-shaped stud formed of an annular post integral with and projecting outwardly from the inner face of the circular recess and an outermost longitudinally-extending crowned head on the outer end of said post, said head extending outwardly of the plane of the inner face of said male half-part, said head having a main axis parallel to the longitudinal vertical axis of said male half-part and having a width less than the width of and a length less than the length of the throat in said outer ring wall, said male and female half-parts being loosely and releasably interengageable in face-to-face relation of the inner faces thereof upon passing said head and post of said stud of said male half-part into the throat of said outer ring wall with the crown of the head of said stud bearing against the button surface and opposite ends of the head of said stud are disposed inwardly of said outer ring wall and rotating said half-parts through 90° relative to each other for independent seating of the seat means of said half-parts with the respective seats of the body, said half-parts having alignable portions for connecting to the spindle whereby the wedge may be subjected to forces for seating thereof in closed position as downward force is applied to said half-parts by the spindle.

References Cited in the file of this patent

UNITED STATES PATENTS

| | | |
|---|---|---|
| 2,565,475 | Cox | Aug. 28, 1951 |

FOREIGN PATENTS

| | | |
|---|---|---|
| 20,921 | Great Britain | of 1910 |
| 119,466 | Great Britain | Aug. 21, 1919 |
| 648,664 | France | of 1928 |
| 740,566 | France | Nov. 21, 1932 |